United States Patent [19]
Mitchell

[11] 3,742,766
[45] July 3, 1973

[54] MOUNT FOR WHEEL BALANCER
[75] Inventor: Wallace F. Mitchell, Arlington Heights, Ill.
[73] Assignee: Ammco Tools, Inc., North Chicago, Ill.
[22] Filed: June 5, 1972
[21] Appl. No.: 259,993

[52] U.S. Cl. .................................. 73/484, 73/487
[51] Int. Cl. ............................................ G01m 1/12
[58] Field of Search ........................... 73/480–487; 144/188 A; 157/1.24

[56] References Cited
UNITED STATES PATENTS
2,178,101  10/1939  Hatch ................................ 73/480
3,204,465  9/1965  Kushmuk et al. ................... 73/483

Primary Examiner—James J. Gill
Attorney—Raymond E. Fidler et al.

[57] ABSTRACT

A plurality of bolt hole engaging pins are freely movable on a flat supporting surface and a centering cone is slidably mounted on the spindle of the balancer for centering the wheel relative to the spindle.

8 Claims, 4 Drawing Figures

PATENTED JUL 3 1973    3,742,766
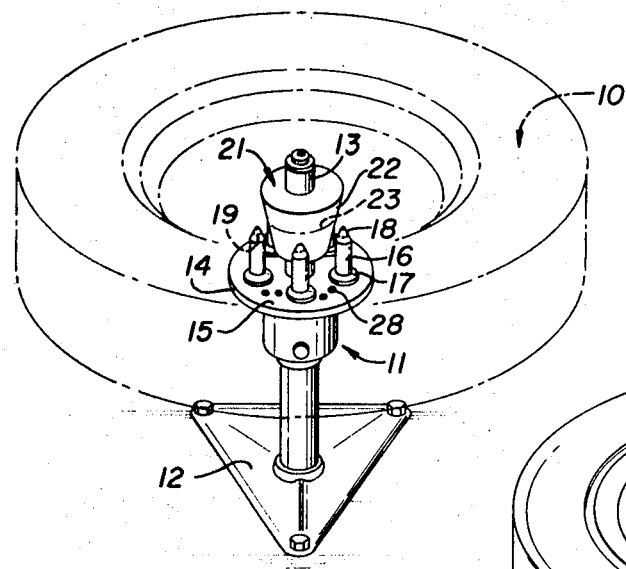
FIG. 1
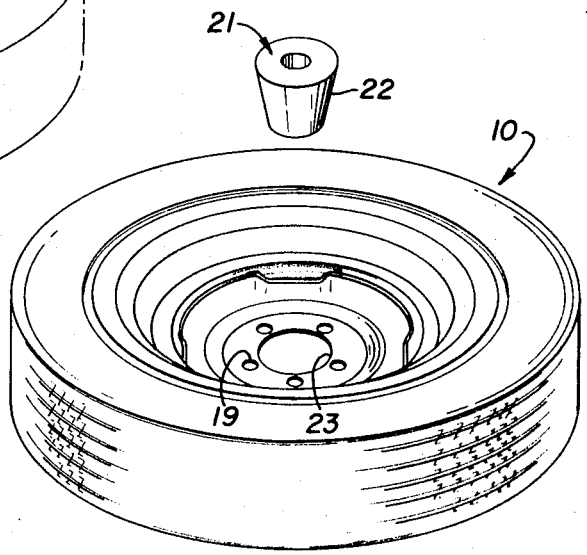
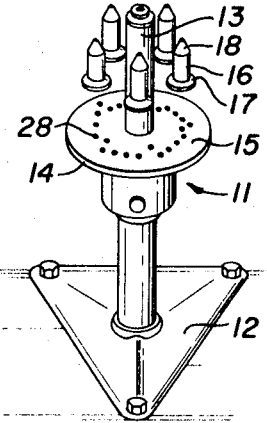
FIG. 2
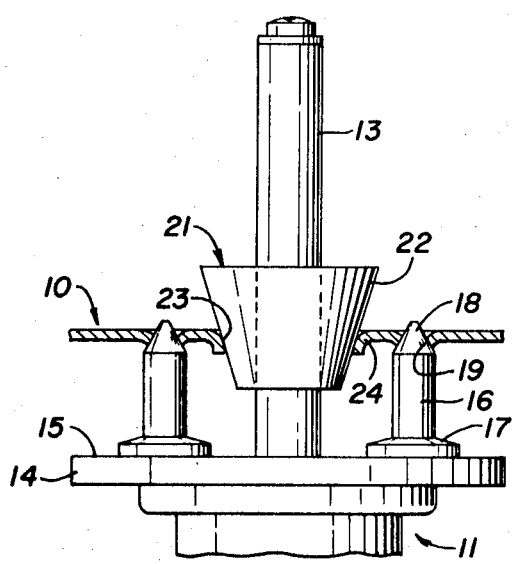
FIG. 3
FIG. 4
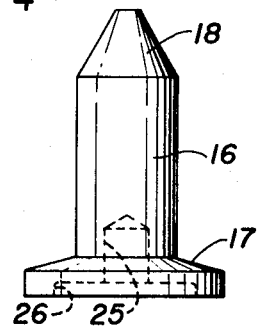

MOUNT FOR WHEEL BALANCER

The present invention relates in general to apparatus for testing the balance of wheels for automotive vehicles, and it relates more particularly to new and improved means for mounting wheels on such apparatus.

BACKGROUND OF THE INVENTION

In order to test a wheel to determine if it is statically and/or dynamically balanced, one common practice is to mount the wheel on a universally movable upright member to which a level is connected. Such a balancer is no better than the wheel mounting mechanism thereof since any displacement or deviation between the principal axis of the wheel and the longitudinal axis of the balancer results in an inherent error in the measurement. It has been recognized that the bolt holes of a wheel are symmetrically arranged about the center hole and are in a common plane lying perpendicular to the axis of the wheel. Accordingly, a common practice has been to utilize such bolt holes for centering a wheel on the balancer and for locating the wheel in a plane perpendicular to the balancing axis of the balancing apparatus. The results have not, however, been entirely satisfactory because all of the several bolt holes are not precisely located. Hence, where precise balancing is necessary, as for example, with the racing type and other wide tread tires, the balance measurements are frequently not repeatable. Moreover, because of the many different sized and locations of the bolt holes, such apparatus has included various adapters which must be updated from year to year as new wheel designs are marketed.

It has been known to use the back side of the wheel to position the plane of the wheel perpendicular to the balancing axis and to use the center hole of the wheel to center the wheel on the balancing axis. One problem with this system is that the back sides of the wheels frequently contain surface defects which adversely affect the balance measurements. Another problem with this prior art balancer has been that the centering cones engage the edge of the center hole too far from the center where the coining or machining is less precise. Both of these problems have led to inaccurate and thus nonrepeatable measurements.

OBJECTS OF THE INVENTION

Therefore, an object of the present invention is to provide new and improved apparatus for mounting a wheel on the spindle of testing apparatus.

Another object of this invention is to provide a new and improved wheel balancer which is better in operation than those heretofore known and which is readily usable with all different arrangements and sizes of bolt holes.

SUMMARY OF THE INVENTION

Briefly, mounting apparatus embodying the present invention comprises a spindle adapted to extend through the center hole of a wheel to be tested, a wheel support fixed to the spindle and having a flat upper surface lying perpendicular to the longitudinal axis of the spindle, a plurality of wheel support pins freely and independently slidable on said upper surface and having conical upper portions receivable in the bolt holes of the wheel, and centering means slidable on the spindle above the wheel for coacting with the edge of the center hole to center the wheel relative to the spindle.

BRIEF DESCRIPTION OF THE DRAWING

Further objects and advantages and a better understanding of the invention may be had from the following detailed description taken in connection with the accompanying drawing, wherein:

FIG. 1 is a perspective view of a wheel balancer embodying the present invention, portions of a wheel mounted thereon being shown in phantom;

FIG. 2 is an exploded, perspective view of the apparatus of FIG. 1;

FIG. 3 is a cross-sectional view of a portion of a wheel mounted by apparatus embodying the present invention; and FIG. 4 is an enlarged view of one of the mounting pins employed in the apparatus of the present invention.

DETAILED DESCRIPTION OF THE DRAWING

Referring now to the drawing and particularly to FIG. 1 thereof, a wheel and tire 10 are mounted on a wheel balancer 11 including a stand 12 on which a spindle 13 is suitably mounted for universal pivotal movement. One such pivot mechanism is disclosed in U.S. Pat. No. 3,492,878, issued on Feb. 3, 1970 to me and assigned to the same assignee as the present invention. Fixedly connected to the spindle 13 is a wheel support member or plate 14 having a planar upper surface 15 lying perpendicular to the principal longitudinal axis of the spindle 13. The plate 14 and the spindle 13 are thus free to pivot as a unit.

In order to mount the wheel such that the plane thereof is perpendicular to the spindle 13, a plurality of wheel support pins 16 having enlarged pedestals 17 are positioned on the flat surface 15 and have conical upper ends 18 which partially extend into the bolt holes 19 in the wheel. The pins 16 have equal heights so as to position the plane of the wheel parallel with the plane of the wheel support surface 15.

In order to center the wheel relative to the central longitudinal axis of the spindle 13, a centering member 21 having a frustoconical outer surface 22 is provided with a central bore which fits closely over the spindle to permit the member 21 to slide on the spindle without any appreciable cocking. The bottom and smallest diameter of the surface 22 is less than the diameter of the center hole 23 of the wheel and the top diameter of the surface 22 is greater than the diameter of the center hole 23 whereby the member 21 may be pressed down on the spindle into the hole 23 to align the wheel with the spindle. During such alignment, the bottom surfaces of the mounting pins 16 are free to slide on the surface 15. Hence, only the edge of the single centering hole 23 is used to center the wheel on the spindle whereby the positions of the bolt holes 19 do not appreciably affect the centering operation.

Since the bolt holes 19 are always symmetrically arranged about the center hole 23 of the wheel, and since the mounting pins have identical weights, the balancing mechanism itself is truly balanced when a wheel is mounted thereon. A 360° spirit level is mounted on the top of the spindle to provide a visible measurement of the condition of balance of the wheel.

As best shown in FIG. 3, the edge of the hole 23 is formed by a beveled lip 24 which, during manufacture, is coined to provide an accurately centered hole. In order to provide accurate centering of the wheel on the spindle 13, I have found that the conical surface 22 should be at an angle of between 15° and 20° relative to the central axis of the spindle 13. A greater angle, such, for example, as the 45° angle used on most centering cones engages the edge of the hole 23 at a location radially outward of the accurately coined circle thus introducing an error into the balancer. On the other hand, too small an angle places too great a limitation on the range of wheel sizes with which a particular centering cone may be used. The member 21 may also be used with those types of wheels in which the center hole is accurately machined.

Referring to FIG. 4, there is shown an enlarged view of one of the wheel support pins 16. As there shown, a hole 25 is drilled in the bottom of each pin 16 to precisely adjust the weight of the pin. For convenience, a counter bore 26 may be provided in the pedestal portion 17.

Preferably, the planar surface 15 is provided with reference marks 28 indicating the approximate position of the pins 16 for a plurality of different wheel designs with which the balancer is likely to be used. For any particular wheel, the pins 16 are approximately centered on the appropriate set of marks and the wheel is then placed over the spindle onto the pins which, being free to slide on the surface, move into the proper positions to support the wheel in a plane perpendicular to the spindle 13. When the centering member is then placed on the spindle, the wheel may be moved laterally so that the conical surface 22 moves into the center hole 19 to align the axis wheel with the axis of the spindle 13. The bubble in the level mounted at the top of the spindle 13 thus indicates the angle and extent to which the wheel is out of static balance.

While the present invention has been described in connection with a particular embodiment thereof, it will be understood that those skilled in the art may make many changes and modifications without departing from the true spirit and scope thereof. Accordingly, the appended claims are intended to cover all such changes and modifications as fall within the true spirit and scope of the present invention.

What is claimed is:

1. Apparatus for mounting a wheel on the spindle of testing apparatus, said wheel having a plurality of mounting holes symmetrically disposed around a central, circular hole, the combination comprising
   a wheel supporting member having a planar upper surface,
   said spindle being affixed to said member and extending upwardly therefrom and having a substantially smaller diameter than that of said central hole,
   a plurality of identical wheel support members equal in number to said mounting holes and each having a flat bottom resting on said upper surface and an inwardly tapered upper portion for partially extending into a respective one of said mounting holes,
   said wheel support members being freely and independently slidable on said planar upper surface, and
   centering means carried by said spindle above said wheel for engagement with the edge of said central hole for centering said wheel relative to said spindle,
   whereby said wheel is supported solely by said mounting members and positioned solely by said centering means.

2. Apparatus according to claim 1 wherein said centering means comprises
   a member slidably mounted on said spindle and having a frustoconical outer surface positionable in said central hole.

3. Apparatus according to claim 2 wherein said frustoconical surface makes an angle of between 15° and 20° with the axis of said spindle.

4. Apparatus according to claim 1 wherein each of said wheel support members comprises
   an elongated rod having an external diameter greater than the diameter of said mounting holes, and
   a base member fixed to the bottom of said rod, said base member having a bottom surface area exceeding the cross-sectional area of said rod.

5. Apparatus according to claim 4 further comprising a plurality of sets of location marks on said planar upper surface respectively corresponding to the locations of the mounting holes in each of a plurality of different wheel designs.

6. Apparatus according to claim 1 further comprising a plurality of sets of location marks on said planar upper surface respectively corresponding to the locations of the mounting holes in each of a plurality of different wheel designs.

7. Apparatus according to claim 3 further comprising a plurality of sets of location marks on said planar upper surface respectively corresponding to the locations of the mounting holes in each of a plurality of different wheel designs.

8. Apparatus according to claim 1 further comprising a 360° spirit level mounted at the top of said spindle.

* * * * *